July 7, 1942.  W. W. MORRAL ET AL  2,288,915
GREEN CORN PICKER
Filed Jan. 22, 1940
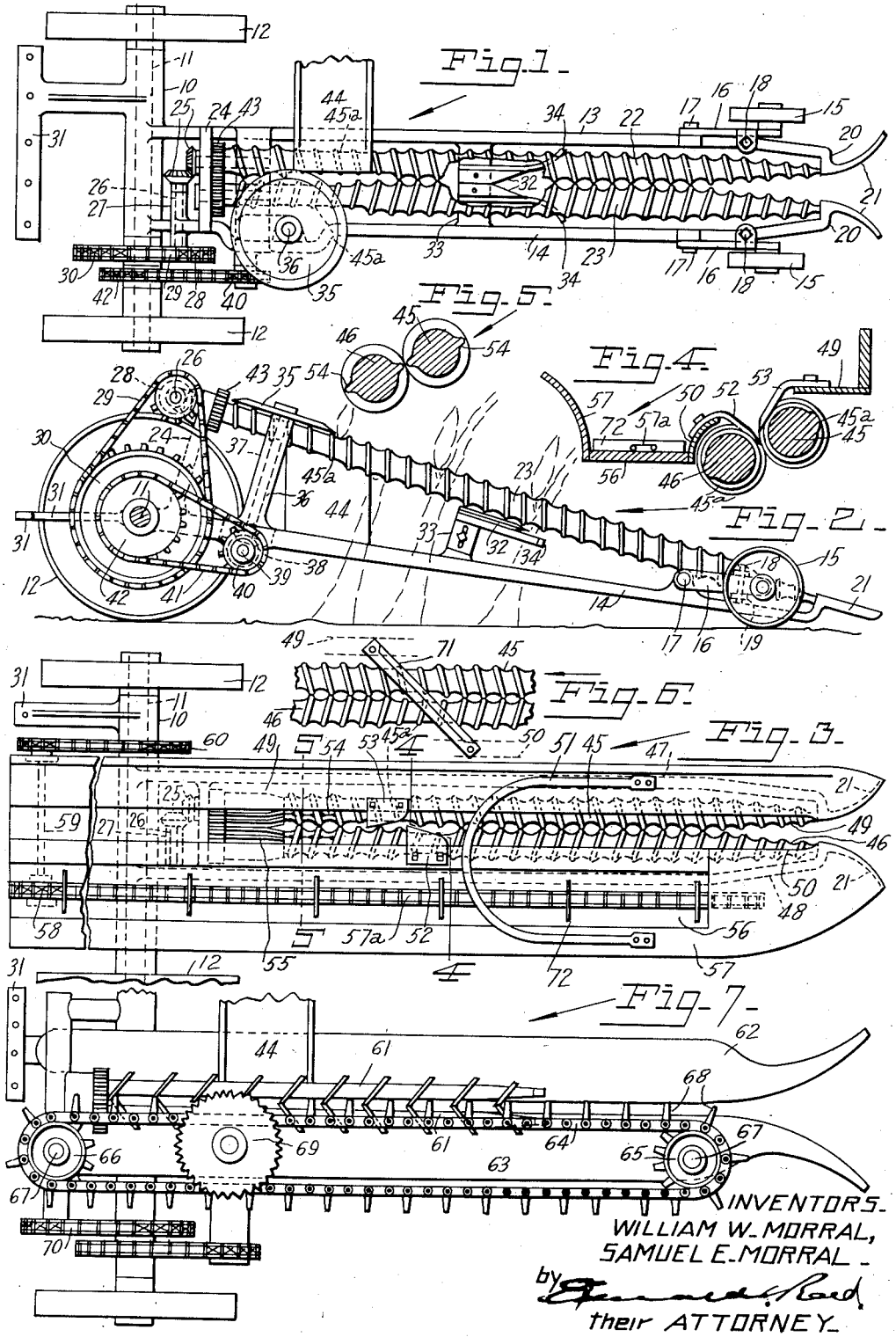
INVENTORS
WILLIAM W. MORRAL,
SAMUEL E. MORRAL
by
their ATTORNEY Patented July 7, 1942

2,288,915

UNITED STATES PATENT OFFICE 2,288,915

GREEN CORN PICKER

William W. Morral and Samuel E. Morral,
Morral, Ohio

Application January 22, 1940, Serial No. 314,914

17 Claims. (Cl. 56—104)

This invention relates to a machine for harvesting green corn and more particularly to that type of harvesting machine known as a corn picker. Corn pickers of various kinds have been used heretofore for removing ripe corn from the stalks in the field, but these ripe corn pickers are not adapted for harvesting green corn, one reason being that they employ snapping rollers for removing ears from the stalk, and snapping rollers would crush green corn or otherwise injure the same.

One object of the present invention is to provide a green corn picker having means for removing the ears from the stalks without crushing or otherwise injuring the grains of corn in the ears.

A further object of the invention is to provide such a machine which will be simple in construction and efficient in operation.

Other objects of the invention may appear as the machine is described in detail.

In the accompanying drawing Fig. 1 is a plan view of a green corn picker embodying the invention and partly broken away; Fig. 2 is a side elevation of the same; Fig. 3 is a plan view of a modified form of green corn picker; Fig. 4 is a section taken on the line 4—4 of Fig. 3; Fig. 5 is a detail section taken on the line 5—5 of Fig. 3; Fig. 6 is a detail view showing a modified form of cutter; and Fig. 7 is a plan view of another form of corn picker embodying the invention.

In the drawing I have shown several machines embodying the invention, for the purpose of illustrating the various forms which the invention may take. In each form illustrated the machine comprises a main frame having a rear portion 10, here shown as a tubular element extending transversely to the machine and in which is rotatably mounted an axle 11 which carries the rear wheels 12. Rigidly secured to and extending forwardly from the rear frame member 10 are two substantially parallel frame members 13 and 14, which slope forwardly and are provided at their forward ends with supporting members adapted to move over the ground and support the forward ends of the frame members 13 and 14 close to but out of engagement with the ground. Preferably these supporting members are in the form of small diameter wheels 15, as shown in Figs. 1 and 2. The supporting members or wheels are preferably adjustable with relation to the frame members to enable the latter to be supported at different distances from the ground and, in the present instance, each wheel 15 is rotatably mounted on the forward end of an arm 16, the rear end of which is pivotally mounted on the adjacent frame member at 17. The arm 16 is adjustably connected with the adjacent frame member and, as here shown, the adjusting means comprises a screw threaded rod or bolt 18 rigidly secured to the frame member and provided with nuts 19 engaging respectively the upper and lower edges of the arm, so that by adjusting these nuts on the rod 18 the position of the arm may be varied, thereby altering the position of the frame member with relation to the wheels. Each of the frame members 13 and 14 has near its forward end an inwardly extending portion 20, the two portions 20 being spaced one from the other and provided with forwardly diverging arms 21 to guide stalks of corn between the frame members.

Supported by the frame members 13 and 14 are devices adapted to engage the stalks of corn and support both the stalks and the ears as the machine moves forwardly with relation to the stalks and to support the ears during the severing operation. As shown in Figs. 1 and 2, these supporting members are in the form of spiral rollers 22 and 23 which are rotatably mounted at their forward ends in the inwardly extending portions 20 of the frame members 13 and 14, and are rotatably mounted at their rear ends in a supplemental frame structure 24 extending upwardly from the main frame near the rear end thereof, so that the spiral rollers have a greater inclination than the frame members 13 and 14. These rollers are arranged substantially parallel, one with the other, with the spirals, or ribs, of the two rollers, close together, the spirals being of such radial width that the stalks of corn will be received between them and gripped by the rollers. The spiral rollers may be rotated in any suitable manner. As here shown, one of the rollers, 22, is connected by beveled gears 25 with a short transverse shaft 26 mounted in a bearing 27 on the main frame and provided at its outer end with a sprocket wheel 28 which is connected by a chain 29 with a sprocket wheel 30 on the axle 11. The driven roller 22 is connected with the roller 23 by spur gears 43 so that the two rollers are rotated in opposite directions. The machine may be propelled in any suitable manner but preferably it is pushed in front of a tractor or the like and the main frame is provided at its rear end with a connecting member 31 by means of which the tractor may be connected therewith.

As the machine is moved forwardly the frame members 13 and 14 move on opposite sides of a row of corn stalks and the stalks are guided, by the guide arms 21, between the spiral rollers 22 and 23, the forward portions of which are preferably tapered, and these rollers act on the stalks to maintain the same in a substantially upright position as the frame members advance with relation thereto, and also serve to draw the stalks downwardly and move the butts of the ears thereon into engagement with the rollers. Means are provided for severing the corn from the stalks and in that form of the apparatus shown in Figs. 1 and 2 this severing means comprises a pair of blades 32 mounted beneath the rollers and, in the present instance, carried by vertically adjustable brackets 33 secured to the respective frame members 13 and 14. The blades 32 are provided with rearwardly converging cutting edges so as to provide a substantially V-shaped cutter, the apex of which lies in a vertical plane extending between the two rollers. Associated with the blades and also supported by the brackets 32 are forwardly diverging guide arms 34 arranged to guide the stalks between the blades in the event the lower portions of the stalks are bent or laterally displaced with relation to the rollers. The stalks and the ears being held in substantially upright positions the forward movement of the machine will cause the cutter to engage the stalk and sever the same below the rollers, thus leaving the lower end of the severed portion of the stalk and the stem of the ear between the rollers, and causing the ear to be maintained in an upright position and moved rearwardly with respect to the rollers as the machine continues to advance, until the stem of the ear is engaged and severed by a second cutter arranged above the rollers. As here shown, this second cutter is a rotatable disk cutter 35 mounted on the upper end of a shaft 36 rotatably mounted in an upright bearing 37 carried by the main frame. The lower end of the shaft 36 is connected by beveled gears 38 to a transverse shaft 39 which carries a sprocket wheel 40 and this sprocket wheel 40 is connected by a chain 41 with a sprocket wheel 42 on the axle 11. As the ear moves rearwardly with relation to the rollers the spirals move the same against the cutter which severs the stem of the ear and also a portion of the stalk with which the ear is connected, the ear falling from the cutter onto a chute 44 which discharges the same at one side of the machine and beyond the path of the adjacent wheel 12. It is important that the stem should be severed below the butt of the ear so as to avoid loosening the husks, it being desirable that the husks should remain on the ears until they are removed therefrom at the cannery. Therefore the spirals which lie beneath the cutter 35 are of reduced radial width so as to permit the cutting edge of the cutter 35 to be so positioned that it cannot engage the butt of the ear. The spirals are only partially cut away, as shown at 45a in Fig. 2, and the remaining portions of the spirals are of sufficient width to move the ear against the cutter and cause the severance of the stem.

The spiral rollers, by drawing the ears into engagement therewith, act as a gage to accurately position the butts of the ears with relation to the cutters. If the ear has a short stem and a large butt the stem will not extend below the rollers and the lower cutter 32 will sever the stalk below the stem, and the ear and the severed upper portion of the stalk will be carried by the rollers to the upper cutter 35 where the stem of the ear will be severed. If the ear has a long stem or a long tapered butt the stem will extend below the rollers and the stem as well as the stalk will be severed by the lower cutter. The rollers may, of course, be so spaced that the stems of all ears will project below the rollers and will be severed by the lower cutter, and if this was done the upper cutter would not be necessary.

In Fig. 3 there is shown another form of the machine in which the frame is substantially similar to that shown in Figs. 1 and 2 and in which spiral rollers 45 and 46 are mounted on the forwardly extending frame members 47 and 48 in substantially the same manner as above described. Mounted above the forwardly extending frame members are guard members 49 and 50 which extend lengthwise of the rollers and overlap the respective rollers, as shown in Fig. 4, but the adjacent edges of these guard members are spaced apart such a distance that they do not interfere with the stalks of corn. The two guard members are braced one against the other by a curved brace member 51. In this form of machine the severing device is arranged above the rollers and is preferably of such a character as to partly sever the stalk adjacent the stem of the ear, the arrangement being such that the stem of the ear may or may not be completely severed at this point. This severing device comprises a blade 52 mounted on the guard member 50 and extending inwardly and downwardly above the roller 46 to a point adjacent the bite of the rollers. A second blade 53 is mounted on the guard member 49 and extends across the roller 45 to a point adjacent the cutting edge of the blade 52 but has its cutting edge arranged at a slightly higher level than the cutting edge of the blade 52, the blade 53 being preferably spaced rearwardly just beyond the blade 52. As a result of this arrangement as the frame moves forwardly with relation to the stalks, which are maintained in upright positions by the spiral rollers, the blade 52 will engage and cut part way through one side of each stalk while the latter is supported against the roller 45, and the cutter 53 will then engage the other side of the stalk and cut part way through the same at a point above the first mentioned cut. As has been stated, the stem of the ear may or may not be completely severed at this time, this depending in part upon the location of the stem with relation to the stalk. After the stalk has been partially severed the spirals in the rear of the cutters grip the stalk and exert a downward pull thereon which will separate the two parts of the stalk and will move the severed upper portion of the stalk downwardly between the rollers to discharge the same beneath the rollers. If the stem of the ear has not been completely severed this downward pull on the stalk will cause the separation to be completed due to the fact that the butt of the ear engages the rollers and limits its downward movement. To facilitate the downward movement of the stalk by the rollers there may, if desired, be provided between adjacent spirals projections or longitudinal blades 54 the edges of which are preferably blunt and of such radial width as to leave a space between the cooperating projections on the two rollers as the latter are brought into engagement with the stalk, it being understood that the projections 54 are so arranged on the rollers that they will be in opposed positions as they move downwardly between the rollers. In the present arrangement the rollers are provided near their rear ends with roughened portions 55 adapted to engage any stalk which may not have been completely discharged by the spirals and complete the downward movement thereof. Extending lengthwise of the main frame and, in the present instance, adjacent to the roller 46, is a conveyor trough, here shown as comprising a bottom portion 56, secured to the lower edge of the guard member 50, and an outer side member 57, the trough being so arranged that the severed ears will fall from the rollers into the trough. Preferably the roller 45 is mounted on an axis slightly higher than the axis of the roller 46 to insure that the severed ear will fall toward the conveyor trough. A conveyor of any suitable kind may be mounted in the trough and, as here shown, it is in the form of an endless chain 57a provided with flights 72 and mounted about sprocket wheels at the respective ends of the trough, the rear sprocket wheel 58 being driven by a shaft 59 which in turn is driven by a sprocket chain 60 from the axle 11 of the main frame.

If desired, instead of using the two cutters as just described a single cutter may be extended across both rollers to completely sever the ear. In Fig. 6 we have shown an elongate blade 71 mounted at its ends on the guard members 49 and 50 and extending across the rollers 45 and 46 at an acute angle to the length of the rollers so as to engage the stalks with a shearing cut. To enable the cutting edge of the blade to be so placed that it will not cut the butt ends of the ears the spirals immediately beneath the blade are of reduced radial width, as shown in Fig. 2.

In Fig. 7 there is shown a further modification of the apparatus in which a conveyor cooperates with the spiral rollers in maintaining the ears and stalks in their upright severing positions as the apparatus moves forwardly. In this arrangement spiral rollers 61 are of a length somewhat less than the length of the forwardly extending frame members 62 and 63. The rollers are mounted on the frame substantially as above described and the adjacent edges of the frame members 62 and 63, beyond the forward ends of the rollers 61, are spaced apart a relatively short distance to guide the stalks to the spiral rollers. A horizontal conveyor chain 64 extends about sprocket wheels 65 and 66 mounted on upright shafts 67 near the respective ends of the frame and this chain is provided with flights 68 which extend across the space between the frame members 62 and 63 and move above the spiral rollers so as to cooperate with the latter in maintaining the stalk and the ear in the desired positions. A rotary cutter 69 is mounted above both conveyors near the rear end of the frame and is driven in substantially the same manner as the disk cutter of Fig. 1 to sever the stalks and the stems. The conveyor 64 is driven from the axle of the machine by a sprocket chain 70 which drives a horizontal shaft connected with the rear upright shaft 67 by beveled gears, not here shown.

While we have shown and described certain embodiments of our invention we wish it to be understood that we do not desire to be limited to the details thereof as various modifications may occur to a person skilled in the art.

Having now fully described our invention, what we claim as new and desire to secure by Letters Patent is:

1. In a green corn picker, a portable frame, a pair of forwardly and downwardly inclined spiral rollers rotatably mounted on said frame to receive stalks of corn between them and support the latter in substantially upright positions with the ears above the rollers as the frame advances with relation to said stalks, a cutter mounted close to said rollers to sever the ears from the stalks, the space between said rollers being of a width less than the thickness of the butts of said ears, and means for rotating said rollers to draw the butts of said ears into supporting engagement with said rollers with the stems of the ears extending between said rollers and in positions to be engaged by said cutter as said frame advances.

2. In a green corn picker, a portable frame, a pair of forwardly and downwardly inclined spiral rollers rotatably mounted on said frame to receive stalks of corn between them and support the latter in substantially upright positions with the ears above the rollers as the frame advances with relation to said stalks, a cutter arranged below and close to said rollers, the space between said rollers being of a width less than the thickness of the butts of said ears, and means for rotating said rollers to draw the butts of said ears into supporting engagement with said rollers with the stems of the ears extending between said rollers, said rollers being of such a diameter that the stem of an ear having supporting contact with said rollers may extend below said rollers to a position to be engaged by said cutter.

3. In a green corn picker, a portable frame, a pair of forwardly and downwardly inclined spiral rollers rotatably mounted on said frame to receive stalks of corn between them and support the latter in substantially upright positions with the ears above the rollers as the frame advances with relation to said stalks, the space between said rollers being of a width less than the thickness of the butts of said ears, means for rotating said rollers to draw the butts of the ears into supporting engagement with said rollers with the stems of the ears extending between said rollers, and a cutter supported on said frame to engage the stems of said ears adjacent the tops of said rollers and sever the same from the butts of said ears.

4. In a green corn picker, a portable frame, a stalk engaging device carried by said frame and comprising spaced rollers arranged to receive the stalks of corn between them, and means for maintaining said stalks in substantially upright positions as said frame advances with relation thereto, a cutter mounted on said frame close to said rollers and extending across the space between said rollers, the space between said rollers being of a width sufficient to permit the forward movement of said rollers with relation to said stalks and less than the thickness of the butts of said ears, and means for rotating said rollers in opposite directions to draw the butts of the ears into supporting engagement with said rollers and thus accurately position the stems of said ears with relation to said cutter.

5. In a green corn picker, a portable frame comprising substantially parallel forwardly extending laterally spaced members adapted to be moved lengthwise of a row of cornstalks with said frame members on opposite sides of said row, forwardly and downwardly inclined stalk engaging devices supported on said frame lengthwise of said frame members and including means to maintain said stalks substantially upright as the frame advances with relation to said stalks and to engage the butts of said ears on said stalks and support said ears in substantially upright positions, and ear severing means supported on said frame above and close to said stalk engaging devices to sever the stems of said ears while said ears are supported in said substantially upright positions.

6. In a green corn picker, a portable frame, a stalk engaging device comprising a pair of forwardly and downwardly inclined rollers rotatably mounted on said frame to receive stalks of corn between them, and means for maintaining said stalks of corn in substantially upright positions with the ears above said rollers as said frame advances with relation to said stalks, said rollers being spaced one from the other a distance less than the thickness of the butts of said ears, and means for rotating said rollers to draw the stems of said ears between said rollers and to draw the butts of said ears into supporting engagement with said rollers, and severing means supported on said frame close to said rollers to engage the stems of ears so supported on said rollers and sever said stems from the butts of said ears.

7. In a green corn picker, a portable frame, a pair of substantially parallel inclined spiral rollers rotatably mounted on said frame and adapted to receive between them stalks of corn and to support the same with the ears above said rollers as the latter are moved forwardly with relation to said stalks, means for rotating said rollers, and cutters mounted on said frame and arranged above the respective rollers with their cutting edges spaced one from the other to engage and partly sever the stalks and to cut the stems of the ears thereon as said rollers move forwardly with relation to said stalks, said rollers having means beyond said cutters to separate the partly severed portions of said stalks.

8. In a green corn picker, a portable frame, a pair of substantially parallel inclined spiral rollers rotatably mounted on said frame and adapted to receive between them stalks of corn and to support the same with the ears above said rollers as the latter are moved forwardly with relation to said stalks, means for rotating said rollers, and cutters mounted on said frame and arranged above the respective rollers with their cutting edges spaced one from the other to engage and partly sever the stalks and to cut the stems of the ears thereon as said rollers move forwardly with relation to said stalks, the spirals of said rollers extending beyond said cutters and having between the turns thereof parts cooperating to grip the stalks and move the same downwardly between said rollers.

9. In a green corn picker, a portable frame, a pair of substantially parallel inclined spiral rollers rotatably mounted on said frame and adapted to receive between them stalks of corn and to support the same with the ears above said rollers as the latter are moved forwardly with relation to said stalks, means for rotating said rollers, and cutters mounted on said frame and arranged above the respective rollers with their cutting edges spaced one from the other to engage and partly sever the stalks and to cut the stems of the ears thereon as said rollers move forwardly with relation to said stalks, the spirals of said rollers extending beyond said cutters and having between the turns thereof parts cooperating to grip the stalks and move the same downwardly between said rollers, said rollers having other cooperating parts beyond said spirals to impart further downward movement to any stalk that is not withdrawn from said rollers by the first mentioned parts.

10. In a green corn picker, a portable frame, a pair of substantially parallel inclined spiral rollers rotatably mounted on said frame and adapted to receive between them stalks of corn and to support the same with the ears above said rollers as the latter are moved forwardly with relation to said stalks, means for rotating said rollers, and cutters mounted on said frame and arranged one in front of the other above the respective rollers with their cutting edges positioned to engage different vertical portions of the stalks and partially sever the same, said rollers having means beyond said cutters to move said stalks downwardly between the rollers and to complete the separation of said stalks.

11. In a green corn picker, a portable frame, a pair of substantially parallel inclined spiral rollers rotatably mounted on said frame and adapted to receive between them stalks of corn and to support the same with the ears above said rollers as the latter are moved forwardly with relation to said stalks, means for rotating said rollers, one of said rollers having a portion of the spiral thereon of reduced radial width, and a cutter mounted on said frame and arranged above the reduced portion of said spiral with its cutting edge close to said reduced spiral to cut the stem of an ear at a point below the butt of the ear.

12. In a green corn picker, a portable frame, a pair of substantially parallel inclined spiral rollers rotatably mounted on said frame and adapted to receive between them stalks of corn and to support the same with the ears above said rollers as the latter are moved forwardly with relation to said stalks, means for rotating said rollers, adjacent portions of the two rollers having the spirals thereon of reduced radial width, and a cutter supported on said frame and extending across said rollers above the reduced portions of said spirals with its cutting edge close to the edges thereof.

13. In a green corn picker, a portable frame, a pair of forwardly and downwardly inclined spiral rollers rotatably mounted on said frame and arranged to receive stalks of corn between them, means for rotating said rollers, severing means mounted on said frame separately from but adjacent to said rollers and arranged to sever the ears from said stalks as said rollers move lengthwise with relation to said stalks, and a conveyor extending lengthwise of said frame alongside one of said rollers, the other roller being slightly higher than the first mentioned roller to cause the severed ears to fall toward said conveyor.

14. In a green corn picker, a portable frame, a pair of forwardly and downwardly inclined spiral rollers rotatably mounted on said frame and arranged to receive stalks of corn between them, means for rotating said rollers, a cutter supported on said frame below said rollers to sever the stalks as said rollers move forwardly with relation to said stalks, and a second cutter supported on said frame above said rollers to sever the stems of the ears on said stalks as the severed stalks and ears are moved rearwardly by the spirals on said rollers.

15. In a green corn picker, a frame, wheels to support said frame, a pair of forwardly and downwardly inclined spiral rollers rotatably mounted on said frame and adapted to receive stalks of corn between them, means driven by said wheels for rotating said rollers, a cutter supported on said frame below said rollers to sever the stalks as said rollers move forwardly with relation to said stalks, and a second cutter rotatably mounted on said frame and extending across one of said rollers to sever the stems of ears on said stalks as the severed portions of said stalks and said ears are moved rearwardly by the spirals on said rollers, and means driven by said wheels to rotate said second cutter.

16. In a green corn picker, a frame, wheels to support said frame, a pair of forwardly and downwardly inclined spiral rollers rotatably mounted on said frame and adapted to receive stalks of corn between them, means driven by said wheels for rotating said rollers, a cutter comprising rearwardly converging blades supported on said frame below said rollers to sever the stalks as said rollers move forwardly with relation to said stalks, a second cutter rotatably mounted on said frame and extending across one of said rollers to sever the stems of ears on said stalks as the severed portions of said stalks and the ears are moved rearwardly by the spirals on said rollers, and means for rotating said cutter from said wheels, a portion of the spiral beneath said second cutter being of reduced width and said second cutter having its cutting edge close to said reduced portion of said spiral.

17. In a green corn picker, a portable frame comprising a pair of substantially parallel frame members spaced laterally one from the other, a pair of inclined spiral rollers mounted on said frame and extending lengthwise of the respective frame members, arms pivotally mounted on the respective frame members near the forward ends thereof, wheels mounted on said arms in spaced relation to the pivotal axes thereof, and means for adjustably connecting said arms with said frame at points spaced from said pivotal axes, and a cutter supported adjacent to said rollers at a point spaced from the front ends thereof.

WILLIAM W. MORRAL.
SAMUEL E. MORRAL.